United States Patent
Blanc et al.

(10) Patent No.: US 9,056,953 B2
(45) Date of Patent: Jun. 16, 2015

(54) SILICONE COMPOSITION FOR ELASTOMER FOAM

(75) Inventors: Delphine Blanc, Lyons (FR); Dominique Canpont, Ternand (FR)

(73) Assignee: BLUESTAR SILICONES FRANCE SAS, Saint-Fons (FR)

( * ) Notice: Subject to any disclaimer, the term of this patent is extended or adjusted under 35 U.S.C. 154(b) by 28 days.

(21) Appl. No.: 13/820,740

(22) PCT Filed: Aug. 25, 2011

(86) PCT No.: PCT/FR2011/000473
§ 371 (c)(1), (2), (4) Date: Aug. 9, 2013

(87) PCT Pub. No.: WO2012/032231
PCT Pub. Date: Mar. 15, 2012

(65) Prior Publication Data
US 2014/0024731 A1    Jan. 23, 2014

(30) Foreign Application Priority Data
Sep. 6, 2010 (FR) ...................... 10 03553

(51) Int. Cl.
| | | |
|---|---|---|
| *C08K 3/36* | (2006.01) | |
| *C08J 9/00* | (2006.01) | |
| *B41F 17/00* | (2006.01) | |
| *C08J 9/02* | (2006.01) | |
| *C08L 83/04* | (2006.01) | |
| *F16J 15/02* | (2006.01) | |
| *C08G 77/12* | (2006.01) | |
| *C08G 77/20* | (2006.01) | |
| *C08G 101/00* | (2006.01) | |
| *C08K 5/05* | (2006.01) | |

(52) U.S. Cl.
CPC ............. *C08J 9/0066* (2013.01); *B41F 17/001* (2013.01); *C08G 77/12* (2013.01); *C08G 77/20* (2013.01); *C08G 2101/00* (2013.01); *C08J 9/02* (2013.01); *C08J 2383/04* (2013.01); *C08K 3/36* (2013.01); *C08K 5/05* (2013.01); *C08L 83/04* (2013.01); *C08L 2205/02* (2013.01); *C08L 2205/03* (2013.01); *F16J 15/022* (2013.01); *C08J 9/0023* (2013.01); *C08J 9/0042* (2013.01); *C08J 9/0061* (2013.01)

(58) Field of Classification Search
CPC ...... C08J 9/0061; C08J 9/0066; C08J 9/0023; C08J 9/02; C08J 9/0042; C08L 83/04; C08K 3/36
See application file for complete search history.

(56) References Cited

U.S. PATENT DOCUMENTS

| | | | |
|---|---|---|---|
| 3,923,705 A | 12/1975 | Smith | |
| 4,189,545 A | 2/1980 | Modic | |
| 4,418,157 A | 11/1983 | Modic | |
| 4,590,222 A | 5/1986 | Bauman | |
| 5,459,167 A | 10/1995 | Giesen | |
| 5,900,438 A | 5/1999 | Miyoshi et al. | |
| 8,410,239 B2 * | 4/2013 | Blanc et al. | 528/32 |
| 2010/0003484 A1 | 1/2010 | Blanc et al. | |

FOREIGN PATENT DOCUMENTS

| | | | |
|---|---|---|---|
| EP | 1094091 | 4/2001 | |
| FR | 2589872 | 5/1987 | |
| JP | 2006083237 | 3/2006 | |
| WO | 0046282 | 8/2000 | |
| WO | 2007141250 | 12/2007 | |
| WO | 2007/141250 | * | 1/2010 |

OTHER PUBLICATIONS

International Search Report of PCT/FR2011/000473 Mailed Nov. 9, 2011.

* cited by examiner

*Primary Examiner* — Margaret Moore
(74) *Attorney, Agent, or Firm* — Miles & Stockbridge P.C.

(57) ABSTRACT

The present relates to novel organopolysiloxane compositions intended to generate an elastomer foam (or silicone foam) with good mechanical properties and low density low density, i.e. less than 0.35 g/cm3 and preferably less than 0.25 g/cm3.

17 Claims, No Drawings

SILICONE COMPOSITION FOR ELASTOMER FOAM

CROSS REFERENCE TO RELATED APPLICATIONS

This application is a §371 National Stage Application of PCT/FR2011/000473, filed Aug. 25, 2011, which claims priority to French Application No. 1003553, filed Sep. 6, 2010.

BACKGROUND OF THE INVENTION

1. Field of the Invention

The present invention relates to novel organopoly-siloxane compositions of low viscosity, i.e. less than 55 000 mPa·s and preferably less than 30 000 mPa·s, intended to generate a foam of silicone elastomer (also known as "silicone foam") with good physical and mechanical properties and of low density, i.e. less than 0.35 g/cm$^3$ and preferably less than 0.25 g/cm$^3$.

2. Description of Related Art

The expression "silicone foam" denotes a polyorganosiloxane composition in the foam form. Silicone foams are well known in the art and their preparation is described in a certain number of patents.

The expression "crystalline silica" denotes a silica in its natural form, of which quartz is one of the most widely known and used forms, in contrast to cristobalite and tridymite, which are much less widely used forms.

The expression "fumed silica" denotes silicas prepared by hydrolysis at high temperature (pyrohydrolysis), in a flame, of silicon tetrachloride SiCl$_4$ according to the following reaction:

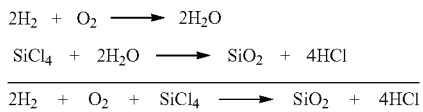

This chemical reaction releases a considerable amount of heat which is evacuated in a cooling zone. The only by-product is hydrochloric acid, which is separated at the outlet of the process and recycled so as to form, by reaction with silicon, silicon tetrachloride.

With regard to silicone foams, several techniques exist for producing them. A first technique employs a condensation reaction with release of volatile by-products. This is the case in particular for systems using the condensation reaction of the SiH—SiOH type, which makes it possible to release hydrogen which then acts as a porogenic agent. For example, French patent No. FR-A-2 589 872 describes a silicone foam precursor composition comprising an organosilicon polymer comprising siloxane units having hydroxyl groups bonded to the silicon, an organosilicon polymer comprising siloxane units having hydrogen atoms bonded to the silicon, a catalyst, for example a tin compound, and a finely divided filler comprising silica which has been treated to become hydrophobic. These compositions cure via a polycondensation reaction and, although they are satisfactory in many respects, the tin-catalyzed compositions described in French patent No. FR-A-2 589 872 are regarded as rather unsatisfactory owing to the use of a tin catalyst, which may exert certain undesirable toxic effects.

A variant described in U.S. Pat. No. 3,923,705 consisted in providing compositions comprising polydiorganosiloxanes bearing hydrogen atoms bonded to the silicon available for a condensation reaction with polydiorganosiloxanes bearing hydroxyl groups bonded to the silicon (silanols) in the presence of a platinum catalyst. This reaction thus makes it possible to construct the network while producing hydrogen gas necessary for the formation of a silicone foam. In this type of formulation, the formation of gas is proportional to the rate of crosslinking and consequently the density of the foams obtained is difficult to control, thus explaining the difficulties in obtaining low-density foams by this technique. These compositions can also comprise a polydiorganosiloxane bearing vinyl groups bonded to the silicon which crosslink simultaneously via polyaddition reactions with the polydiorganosiloxanes bearing hydrogen atoms bonded to the silicon, thus participating in the construction of the network of the silicone foam.

According to another variant described in U.S. Pat. No. 4,189,545, silicone foams are prepared from a composition comprising water, a polydiorgano-siloxane bearing vinyl groups bonded to the silicon, a polydiorganosiloxane containing hydrogen atoms bonded to the silicon and borne by units in the chain and not exclusively at the chain end, in order to be able to act as a crosslinking agent. The water reacts with the polysiloxane comprising hydride functions, thus producing hydrogen gas and a silanol. The silanol then reacts with the polydiorganosiloxane comprising hydride functions via a condensation reaction, thus generating a second molecule of hydrogen gas, while another polydiorganosiloxane bearing vinyl groups bonded to the silicon will simultaneously react, via an addition reaction, with another polydiorganosiloxane comprising a hydride function, thus participating in the construction of the network of the silicone foam. The main contribution made by this technique is that the hydrogen gas is produced without the addition of silanol and with the addition of a small amount of water.

In U.S. Pat. No. 4,590,222, silicone foams are prepared from a composition comprising a polydiorganosiloxane, a resin, a platinum-based catalyst, an organohydro-siloxane, a polyorganosiloxane bearing hydroxyl groups on the chain-end units, a filler and an organic alcohol.

However, techniques which use silanol as a source of porogenic agent have a tendency to give foams having densities which are too high for many applications, for example those intended for the transport industry. Furthermore, when medium-density foams are obtained, this most commonly occurs to the detriment of the mechanical properties (tensile strength, tear strength, etc.).

Another technique consists in using porogenic agents or additives, added to the silicone matrix, which, under the action of heat, expand the material:

either by decomposition with release of gas, the case in particular of derivatives of azo type, for example azodicarbonamide, which will make it possible to release nitrogen, carbon dioxide gas and ammonia. This type of porogenic agent, despite the fact that it is widely used for other materials, presents serious problems of toxicity (release of hydrazine), or by a phase change (liquid to gas)—the case in particular of low-boiling-point solvents.

Finally, an alternative technique consists in mechanically introducing a gas (for example, nitrogen) into the silicone matrix under pressure, followed by passage into a dynamic mixer, which makes it possible to obtain foams having good characteristics; however, they require bulky and expensive equipment.

Thus, despite the existence of the numerous techniques mentioned above, the production of low-density (less than 0.35 g/cm³ or 0.25 g/cm³) silicone foams from a composition of relatively low viscosity or of low viscosity (viscosity less than 55 000 mPa·s or than 30 000 mPa·s) still remains a problem which arouses the interest of silicone producers. For example, U.S. Pat. No. 4,418,157 describes silicone foam precursor compositions exhibiting, before crosslinking, a viscosity of less than 100 000 mPa·s. As is indicated in that patent, it is known (see column 2, lines 13 to 24) that the greater the viscosity of the composition, the less dense the resulting foam. Thus, an advantageous approach is described in that patent which consists in preparing a composition having a viscosity of less than 100 000 mPa·s and comprising a silicone base capable of crosslinking by polyaddition or polycondensation, to which are added a silicone resin of "MQ" type (nomenclature of the silicones as described, for example, in the work by Walter Noll "Chemistry and Technology of Silicones", Academic Press, 1968, $2^{nd}$ edition, on pages 1 to 9), optionally comprising vinyl functions, and water, which is described as a key constituent for the creation of hydrogen gas as described above. The addition of this specific resin makes it possible to lower the density of the foam obtained, even though the precursor composition is of low viscosity. However, this type of resin is an expensive raw material, the industrial synthesis of which requires bulky and expensive equipment.

Another example of a silicone foam precursor composition is described in the reference WO-A-00/46282. The composition described comprises a silicone base which crosslinks via a polyaddition reaction (polyorganosiloxane oil comprising an ≡SiH function/polyorganosiloxane oils comprising an ≡SiVi function/Pt catalyst, with Vi=vinyl group), a compound comprising a hydroxyl function and wollastonite (the examples describe compositions with high levels of fillers, approximately 21 parts by weight of fillers relative to the total weight of the composition). It should be noted that the viscosities of the compositions prepared in the examples (example 1, table 2) are all greater than 190 000 mPa·s. As is indicated above, it is known (see U.S. Pat. No. 4,418,157, column 2, lines 13 to 24) that the greater the viscosity of the composition, the less dense the resulting foam. It will be noted that, from the most viscous composition (reference WO-A-00/46282, table 2, page 13, composition [1-1], viscosity of 274 000 mPa·m) to the least viscous composition [1-3] (viscosity=198 000 mPa·s), the density of the foam obtained increases (from 0.20 g/cm³ to 0.25 g/cm³), thus confirming the known teaching relating to the difficulty in obtaining low-density foams from compositions of low viscosity (viscosity less than 55 000 mPa·s or than 30 000 mPa·s) before crosslinking. In point of fact, for reasons of optimization with regard to the use of these compositions, either by the end user or by manufacturers using silicone foam production lines, it is vital to be able to have a composition which, before crosslinking, is in a form of relatively low viscosity which readily flows in the appropriate tools.

Another problem encountered in the prior art foams relates to the sizes and the size distributions of the bubbles in the silicone foam material. Indeed, when said bubbles are too large, they lead to anisotropy of the physical properties according to the points of measurement. The expression "anisotropy of the physical properties" is intended to mean a variation in the values measured according to the point of measurement of the silicone foam.

The expression "bubbles of small size" for a silicone foam is intended to mean bubbles of which the width (or diameter) is less than or equal to approximately 1 mm, the expression "bubbles of medium size" is intended to mean that the width (or diameter) is between 1 and 1.5 mm, whereas, for "bubbles of large size", the width (or diameter) is greater than 1.5 mm.

For example, document WO 2007/141250 describes an organopolysiloxane composition which is a precursor of a silicone foam, comprising:
  at least one polyorganosiloxane (A) exhibiting, per molecule, at least two $C_2$-$C_6$ alkenyl groups bonded to the silicon and having a viscosity of between 10 and 300 000 mPa·s,
  at least one polyorganosiloxane (B) exhibiting, per molecule, at least two hydrogen atoms bonded to the silicon and preferably at least three ≡SiH units and having a viscosity of between 1 and 5000 mPa·s,
  a catalytically effective amount of at least one catalyst (C) composed of at least one metal belonging to the platinum group,
  at least one porogenic agent (D) chosen from the group consisting of alkanols comprising from 1 to 18 carbon atoms,
  optionally at least one inorganic and/or metal filler (F) which may be a fumed silica which is described as being generally characterized by a specific surface area of between 20 and 300 m²/g,
  optionally at least one additive (G), and
  with the additional condition that the choice, the nature and the amount of the constituents are determined such that the viscosity of said composition has to be less than 50 000 mPa·s, preferably less than 35 000 mPa·s and even more preferentially less than 15 000 mPa·s.

However, the compositions exemplified all contain diatomaceous earths which do not make it possible to simultaneously obtain good storage stability and a homogeneous foam (problem of anisotropy of the physical properties according to the points of measurement).

For some applications, such as pad printing (or roller printing), specific properties of silicone foams are sought. Indeed, pad printing is an indirect printing process. The pattern to be printed is pre-engraved onto a backing, the plate is then attached to a pad-printing machine, and then the ink is deposited on the engraved parts in order to transfer the pattern onto the object to be printed by means of a pad or a roller made of silicone foam. In order to obtain an engraving and print of quality, it is essential that the pad or the roller made of silicone foam consists of bubbles of small sizes (the width or diameter is less than or equal to approximately 1 mm) and that the size distribution of the bubbles within the material be homogeneous so that the ink can be deposited and transferred uniformly onto the recipient layer backed by the layer of silicone foam while at the same time allowing a precise reproduction of the engraving. Thus, the need to obtain foams having bubbles of small size and a homogeneous bubble size distribution is particularly sought for this application.

Furthermore, the silicone foam industry is always seeking new compositions, which are silicone foam precursors, having a low viscosity, i.e. less than 55 000 mPa·s or than 30 000 mPa·s at 25° C., and capable of exhibiting good physical properties after crosslinking.

All the viscosities with which the present account is concerned correspond to a dynamic viscosity quantity which is measured, in a manner known per se, at 25° C. The viscosities are measured using a Brookfield viscometer according to the instructions of the AFNOR NFT 76-102 standard. These viscosities correspond to a "Newtonian" dynamic viscosity quantity at 25° C., i.e. the dynamic viscosity which is measured, in a manner known per se, at a shear rate gradient which is sufficiently low for the viscosity measure to be independent of the rate gradient.

However, when the formulation of low-viscosity compositions which have siliceous reinforcing fillers in order to improve the mechanical properties is attempted, one of the major problems encountered is the appearance of settling, which is observed especially after storage for a few months. Indeed, this phenomenon is observed when these compositions are stored, for example, in the form of a two-component system (or more commonly known as "RTV-2" system) for compositions which can foam at room temperature. Indeed for reasons of reactivity (crosslinking and foaming) and safety, the components are placed in two distinct parts in order to separate the catalysts and the porogenic agent comprising a hydroxyl function from the silicone oil comprising an SiH group. These settling phenomena make the composition unusable for certain applications.

The problem considered here can therefore be summarized as the search for a technical compromise between specifications, a priori contradictory, for the preparation of a composition having a low viscosity, i.e. less than 55 000 mPa·s or than 30 000 mPa·s, no longer exhibiting a settling problem when a siliceous reinforcing filler is used and which is a precursor of a silicone foam which has a low density, i.e. less than 0.35 g/cm$^3$ and preferably less than 0.25 g/cm$^3$, with good mechanical properties, bubble sizes of the order of less than or equal to 1 mm and a homogeneous bubble size distribution within the foamed material.

SUMMARY

An objective of the present invention is thus to provide a novel organopolysiloxane composition of low viscosity, i.e. less than 55 000 mPa·s or than 30 000 mPa·s, which is intended to generate, after crosslinking and/or curing, a silicone foam of low density, i.e. less than 0.35 g/cm$^3$ and preferably less than 0.25 g/cm$^3$, while at the same time obtaining silicone foams exhibiting good mechanical properties, bubble sizes of which the width or the diameter is less than or equal to approximately 1 mm and a homogeneous bubble size distribution within the material.

The applicant has now found, very surprisingly, that it is possible to obtain a silicone foam of low density having a density of less than 0.35 g/cm$^3$ and in certain cases less than 0.25 g/cm$^3$, bubble sizes of which the width or the diameter is less than or equal to approximately 1 mm and a homogeneous bubble size distribution and which is prepared from a specific composition of which the viscosity before crosslinking is less than 55 000 mPa·s or less than 30 000 mPa·s and which no longer exhibits a settling problem when siliceous reinforcing fillers are used.

A subject of the invention is therefore an organopolysiloxane composition X which is a precursor of a silicone foam, comprising:
- at least one polyorganosiloxane A having a viscosity of between 10 and 300 000 mPa·s and exhibiting, per molecule, at least two $C_2$-$C_6$ alkenyl groups bonded to the silicon,
- at least one polyorganosiloxane B having a viscosity of between 1 and 5000 mPa·s and exhibiting, per molecule, at least two ≡SiH units and preferably at least three ≡SiH units,
- a catalytically effective amount of at least one catalyst C which is a compound derived from at least one metal belonging to the platinum group,
- at least one porogenic agent D,
- optionally at least one diorganopolysiloxane oil E blocked at each end of its chain by a triorganosiloxy unit, the organic radicals of which bonded to the silicon atoms are chosen from alkyl radicals having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups, such as xylyl, tolyl and phenyl,
- at least one inorganic filler F which is a fumed silica, the specific surface area S of which is strictly less than 65 m$^2$/g, preferably strictly less than 50 m$^2$/g and even more preferentially less than or equal to 45 m$^2$/g,
- optionally at least one additive G, and
- optionally at least one polyorganosiloxane resin H,
with the additional condition that the choice, the nature and the amount of the constituents are determined such that the viscosity of said organopolysiloxane composition X is less than 55 000 mPa·s, preferably less than 30 000 mPa·s and even more preferentially less than 25 000 mPa·s and said viscosities are dynamic viscosities measured at 25° C. using a Brookfield viscometer according to the instructions of the AFNOR NFT 76-102 standard.

DETAILED DESCRIPTION OF A PREFERRED EMBODIMENT

The applicant has discovered, fortuitously and unexpectedly, that the use of a fumed silica, the specific surface area S of which is strictly less than 65 m$^2$/g and preferably strictly less than 50 m$^2$/g, in a composition which is a precursor of a silicone foam, makes it possible to achieve the above-mentioned objectives.

It is particularly advantageous to use fumed silicas, the specific surface area S of which is included in the following range 25 m$^2$/g≤S≤45 m$^2$/g, so as to be able to find a compromise between the desired properties.

According to one advantageous embodiment, the inorganic filler F is a fumed silica, the surface of which has been pretreated, for example by treatment with the various organosilicon compounds commonly employed for this use. Thus, these organosilicon compounds can be organochlorosilanes, diorganocyclopolysiloxanes, hexa-organodisiloxanes, hexaorganodisilazanes, diorganopoly-siloxanes or diorganocyclopolysilazanes (French patents FR-A-1 126 884, FR-A-1 136 885, FR-A-1 236 505, British patent GB-A-1 024 234).

According to one preferred embodiment, the amount of the inorganic filler F is between 0.1 and 20 parts by weight per 100 parts by weight of the organopolysiloxane composition X.

The composition according to the invention may optionally contain at least one reinforcing filler F', the objective of which is to confer good mechanical and rheological characteristics on the elastomers ensuing from the curing of the compositions in accordance with the invention. Use may, for example, be made of very finely divided inorganic fillers, the mean particle diameter of which is less than 0.1 µm. These fillers include fumed silicas and precipitated silicas. These fillers can also be in the form of more coarsely divided products, with a mean particle diameter of greater than 0.1 µm. As examples of such fillers, mention may be made of ground quartz, diatomaceous silicas, calcium carbonate optionally surface-treated with an organic acid or with an ester of an organic acid, calcined clay, titanium oxide of the rutile type, oxides of iron, zinc, chromium, zirconium, magnesium, the various forms of alumina (hydrated or nonhydrated), boron nitride, lithopone, barium metaborate, barium sulfate or glass microbeads. These fillers may have been surface-modified by treatment with the various organosilicon compounds commonly employed for this use. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885, FR-A-1 236 505, British patent GB-A-1 024 234). The treated fillers contain, in most cases, from 3% to 30% of their weight of organosilicon compounds. The amount used depends on the desired mechanical properties and is generally between 0.1 and 20 parts by weight per 100 parts by weight of the organopolysiloxane composition X.

According to one embodiment, the porogenic agent D is a compound comprising a hydroxyl function and which is not a retarder or an inhibitor of the hydrosilylation reaction, such as an α-acetylenic alcohol.

Preferably, the porogenic agent D is a compound chosen from the group consisting of a polyol, an alcohol which is not a retarder or an inhibitor of the hydrosilylation reaction, such as an α-acetylenic alcohol, an organosilane or a polyorganosilane containing at least one silanol function, and water.

Preferably, the porogenic agent D is a compound chosen from the group consisting of a diol which is not a retarder or an inhibitor of the hydrosilylation reaction, such as an α-acetylenic alcohol, an organic alcohol having from 1 to 12 carbon atoms and having one hydroxyl function per molecule, an organosilane or a polyorganosilane containing at least one silanol function, and water.

When the porogenic agent is water, it can be introduced in the form of an aqueous emulsion, for example an oil-in-water direct silicone emulsion or a water-in-oil inverse silicone emulsion comprising a silicone oily continuous phase, an aqueous phase and a stabilizer.

Direct emulsions can be obtained by emulsification processes well known to those skilled in the art; the process consists in placing in an emulsion, in an aqueous phase containing a stabilizer, for example a surfactant, a mixture of the constituents. An oil-in-water emulsion is then obtained. The missing constituents can then be added, either directly to the emulsion (in the case of water-soluble constituents), or subsequently in the form of an emulsion (in the case of constituents soluble in the silicone phase). The particle size of the emulsion obtained can be adjusted by means of the conventional methods known to those skilled in the art, in particular by continuing the stirring in the reactor for a suitable period of time.

The inverse silicone emulsions consist of droplets of water in a silicone oil continuous phase. They can be obtained by means of emulsification processes well known to those skilled in the art and which involve mixing an aqueous phase and an oily phase with or without grinding, i.e. under strong shear. The stabilizer is preferably chosen from the group comprising:
nonionic, anionic, cationic, or even zwitterionic surfactants;
silicone polyethers;
solid particles, preferably particles of silica optionally in combination with at least one costabilizer, preferably selected from nonionic, anionic, cationic or even zwitterionic surfactants;
and mixtures thereof.

The surfactants are chosen more generally according to the HLB. The term HLB (hydrophilic lipophilic balance) denotes the ratio of the hydrophilicity of the polar groups of the surfactant molecules to the hydrophobicity of their lipophilic component. HLB values are in particular reported in various basic manuals, such as the "Handbook of Pharmaceutical Excipients, The Pharmaceutical Press, London, 1994)".

Water/silicone emulsions can also be stabilized via silicone polyethers (Silicone Surfactants—Surfactant Science Series V86 Ed Randal M. Hill (1999)).

Examples of porogenic agents D are, for example:
water,
$C_1$ to $C_{12}$ alcohols having one hydroxyl group, for example methanol, ethanol, n-propanol, isopropanol, a butanol such as n-butanol, 2-butanol and tert-butanol, a pentanol, a hexanol, n-octanol and benzyl alcohol, or
polyols such as $C_3$ to $C_{12}$ diols having two hydroxyl groups, which are linear or branched, and which optionally comprise an aromatic ring not functionalized with a hydroxyl group. Examples of diols are, for example, 1,4-butanediol, 1,5-pentanediol and 1,7-heptanediol.

The polyorganosiloxane A exhibiting, per molecule, at least two $C_2$-$C_6$ alkenyl groups bonded to the silicon, and having a viscosity of between 10 and 300 000 mPa·s, can in particular be formed:
of at least two siloxyl units of formula:

$$Y_d R_e SiO_{\frac{(4-d-e)}{2}} \quad (I)$$

in which:
Y is a $C_2$-$C_6$ alkenyl, preferably vinyl,
R is a monovalent hydrocarbon-based group with no unfavorable action on the activity of the catalyst and is generally chosen from alkyl groups having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups, such as xylyl, tolyl and phenyl,
d=1 or 2, e=0, 1 or 2 and the sum d+e=1, 2 or 3, and
optionally of siloxyl units having the average formula below:

$$R_f SiO_{\frac{4-f}{2}} \quad (II)$$

in which R has the same meaning as above and f=0, 1, 2 or 3.

The following compounds are examples of polyorganosiloxane A: dimethylpolysiloxanes comprising dimethylvinylsilyl ends, (methylvinyl)(dimethyl)polysiloxane copolymers comprising trimethylsilyl ends or (methylvinyl)-(dimethyl) polysiloxane copolymers comprising dimethyl-vinylsilyl ends. In the form which is most recommended, the polyorganosiloxane A contains end vinylsiloxy units.

Examples of polyorganosiloxane B exhibiting, per molecule, at least two hydrogen atoms bonded to the silicon and preferably at least three ≡SiH units and having a viscosity of between 1 and 5000 mPa·s are those comprising:
siloxyl units of formula:

$$H_g X_i SiO_{\frac{4-g-i}{2}} \quad (III)$$

in which:
X is a monovalent hydrocarbon-based group with no unfavorable action on the activity of the catalyst and is generally chosen from alkyl groups having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups, such as xylyl, tolyl and phenyl,
g=1 or 2, preferably equal to 1, i=0, 1 or 2, and g+i=1, 2 or 3, and optionally siloxyl units having the average formula:

$$X_iSiO_{\frac{4-j}{2}} \quad (IV)$$

in which X has the same meaning as above and j=0, 1, 2 or 3.

Appropriate polyorganosiloxanes B are polymethylhydrosiloxanes.

The catalyst C composed of at least one metal belonging to the platinum group is also well known. The metals of the platinum group are those known under the name platinoids, a term which combines together, in addition to platinum, ruthenium, rhodium, palladium, osmium and iridium. Platinum compounds and rhodium compounds are preferably used. Use may in particular be made of the complexes of platinum and of an organic product described in U.S. Pat. No. 3,159,601, U.S. Pat. No. 3,159,602 and U.S. Pat. No. 3,220,972 and European patents EP-A-0 057 459, EP-A-0 188 978 and EP-A-0 190 530, and the complexes of platinum and of vinylated organosiloxanes described in U.S. Pat. No. 3,419,593. The catalyst generally preferred is platinum. Preference is given to the Karstedt solution or complex, as described in U.S. Pat. No. 3,775,452.

The constituent E is, for example, a nonfunctionalized linear polydimethylsiloxane, i.e. comprising repeat units of formula $(CH_3)_2SiO_{2/2}$ and exhibiting $(CH_3)_3SiO_{1/2}$ units at its two ends.

It is possible in particular to incorporate, as additive G, a catalyst inhibitor in order to retard the crosslinking. Use may in particular be made of organic amines, silazanes, organic oximes, diesters of dicarboxylic acids, acetylenic ketones and acetylenic alcohols (cf., for example, FR-A-1 528 464, 2 372 874 and 2 704 553). The inhibitor, when one of them is used, can be inserted in a proportion of from 0.0001 to parts by weight, preferably 0.001 to 3 parts by weight, per 100 parts of polyorganosiloxane A. Phosphines, phosphites and phosphonites are also among the inhibitors which can be used in the invention. Mention may in particular be made of the compounds of formula $P(OR)_3$ described in U.S. Pat. No. 6,300,455. All these compounds are known to those skilled in the art and are commercially available. Mention may, for example, be made of the following compounds:

- polyorganosiloxanes substituted with at least one alkenyl which can optionally be in cyclic form, tetramethylvinyltetrasiloxane being particularly preferred,
- pyridine,
- organic phosphines and phosphites,
- unsaturated amides,
- alkylated maleates, and
- acetylenic alcohols which have the formula:

(R')(R")C(OH)—C≡CH in which formula,
    R' is a linear or branched alkyl radical or a phenyl radical;
    R" is a hydrogen atom or a linear or branched alkyl radical or a phenyl radical; it being possible for the radicals R' and R" and the carbon atom located in the α position with respect to the triple bond to optionally form a ring; and
    the total number of carbon atoms contained in R' and R" being at least 5, preferably from 9 to 20.

For said acetylenic alcohols, mention may be made, by way of examples, of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol, and
diallyl maleate or diallyl maleate derivatives.

These inhibitors are added in an amount by weight of between 1 and 50 000 ppm relative to the weight of the total silicone composition, in particular between 10 and 10 000 ppm and preferably between 20 and 2000 ppm.

Mention may be made, as other additive G, of thixotropic additives for making it possible to thicken, to a correct extent, the silicone elastomer foam precursor compositions without for all that affecting their fluidity necessary for handling them and in such a way that the composition, before crosslinking, does not spontaneously flow if this is not required. In the applications covered by the invention, it is advisable to have a crosslinkable composition which has rheological properties such that it can be readily usable (good fluidity) and such that it is capable of retaining the shape given thereto at least for the time necessary for the crosslinking for definitively fixing the memory of the intended shape. The silicone compositions crosslinkable in this rheological state can be described as non-drip. It is in fact important in these applications that the composition does not flow in the interstices of the mold. The thixotropic additive G thus modifies the rheological properties of the composition by giving it a high yield point.

As thixotropic agent, mention may be made of:
ultrafine silicas in appropriate proportion;
silicone polyethers functionalized with polyethylene oxide (PEO) and/or polypropylene oxide (PPO) functions, such as the following commercial products: DBP-534, DBP-732, DBE-224, DBE-821, DBE-621, DBE-814 or DBE-712 sold by the company Gelest Inc., DC-193 sold by the company Dow Corning, or the products Tegopren®-5878, Tegopren®-3022, Tegopren®-5863, Tegopren®-3070, Tegopren®-5851, Tegopren®-5847 or Tegopren®-5840 sold by the company Evonik Industries, and also the silicone polyethers comprising siloxyl units below:

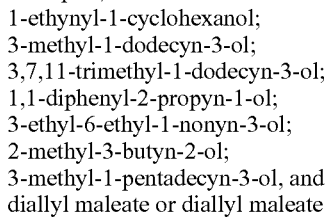

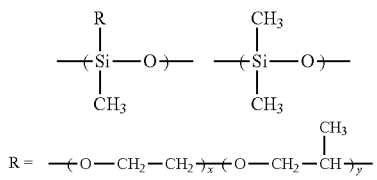

(x and y being integers ≥0 with x+y≥1)

fluorinated resins which are fluoropolymers containing C—F bonds, such as, for example, polyvinyl fluoride, polyvinylidene fluoride, polytetra-fluoroethylene (PTFE), polymonochlorotrifluoroethylene, polyfluoropolyethers, ethylene/tetrafluoroethylene copolymers, tetrafluoroethylene/perfluorovinyl ether copolymers, or perfluoroethylene/perfluoropropylene copolymers. Examples are described in international patent application No. WO 2000/060011-A1, compounds based on an amine (polymer chain, preferably silicone polymer chain, grafted with primary amine or secondary amine functions) or on polyglycols, and polyorganosiloxanes functionalized with cyclic amine functions and in particular with piperidinyl functions which can be used alone or in combination with silicas having undergone a surface treatment. Examples are described in international patent application WO 2003/037987-A1.

The polyorganosiloxane resins H are branched organopolysiloxane oligomers or polymers which are well known and commercially available. They are in the form of solutions, preferably siloxane solutions. As examples of branched organopolysiloxane oligomers or polymers, mention may be made of "MQ" resins, "MDQ" resins, "TD" resins and "MDT" resins, it being possible for the alkenyl functions to be borne by the M, D and/or T siloxyl units. Those skilled in the art in the silicone field commonly use this nomenclature which represents the following siloxyl units:

$R_3SiO_{1/2}$ (M unit), $RSiO_{3/2}$ (T unit), $R_2SiO_{2/2}$ (D unit) and $SiO_{4/2}$ (Q unit), with R being a $C_2$ to $C_6$ alkenyl group, such as a vinyl, allyl or hexenyl group, a monovalent hydrocarbon-based group chosen from alkyl groups having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups, such as xylyl, tolyl and phenyl.

The polyorganosiloxane resins H which are particularly useful according to the invention are silicone resins comprising "Si-alkenyl" functions, i.e. resins comprising vinyl, allyl and/or hexenyl functions. According to one preferred embodiment of the invention, the polyorganosiloxane resins H are vinylated silicone resins. Advantageously, they comprise in their structures from 0.1% to 20% by weight of alkenyl group(s). In these resins, the alkenyl groups can be located on siloxyl units (M), (D) or (T). These resins can be prepared, for example, according to the process described in U.S. Pat. No. 2,676,182. A certain number of these resins are commercially available, most commonly in the form of solutions, for example in xylene.

For example, the polyorganosiloxane resin H comprises:
at least two different siloxyl units chosen from those of formula:

$$W_a Z_b SiO_{(4-(a+b))/2} \quad (V)$$

in which:
the W symbols, which may be identical or different, each represent a $C_2$-$C_6$ alkenyl group;
the Z symbols, which may be identical or different, each represent a nonhydrolyzable monovalent hydrocarbon-based group which has no unfavorable action on the activity of the catalyst, which is optionally halogenated and which is preferably chosen from alkyl groups and also from aryl groups, and
a is 1 or 2, preferably 1, b is 0, 1 or 2 and the sum a+b is equal to 1, 2 or 3,
and optionally units having the formula below:

$$Z_c SiO_{(4-c)/2} \quad (VI)$$

in which Z has the same meaning as above and c is equal to 0, 1, 2 or 3,
with the condition that at least one of the units (V) or (VI) is a T or Q unit.

In one preferred embodiment of the invention, the polyorganosiloxane resin H is a resin which comprises Si-Vi units (with "Vi" meaning a vinyl group) and is chosen from the group consisting of the following silicone resins:
$MD^{Vi}Q$ where the vinyl groups are included in the D units,
$MD^{Vi}TQ$ where the vinyl groups are included in the D units,
$MM^{Vi}Q$ where the vinyl groups are included in a part of the M units,
$MM^{Vi}TQ$ where the vinyl groups are included in a part of the M units,
$MM^{Vi}DD^{Vi}Q$ where the vinyl groups are included in the M and D units,
and mixtures thereof,
with:
M=siloxyl unit of formula $R_3SiO_{1/2}$
$M^{Vi}$=siloxyl unit of formula $(R_2)(vinyl)SiO_{1/2}$
D=siloxyl unit of formula $R_2SiO_{2/2}$
$D^{Vi}$=siloxyl unit of formula $(R)(vinyl)SiO_{2/2}$
Q=siloxyl unit of formula $SiO_{4/2}$;
T=siloxyl unit of formula $RSiO_{3/2}$, and
the R groups, which may be identical or different, are monovalent hydrocarbon-based groups chosen from alkyl groups having from 1 to 8 carbon atoms inclusive, such as methyl, ethyl, propyl and 3,3,3-trifluoropropyl groups, and aryl groups, such as xylyl, tolyl and phenyl.

According to another particular embodiment of the invention, the polyorganosiloxane resin H is added to the composition according to the invention in the form of a mixture in at least one polyorganosiloxane oil.

According to another embodiment of the invention, the vinylated polyorganosiloxane resin H is present in the silicone elastomer composition before crosslinking at up to 25%, preferably up to 20% and even more preferentially between 1% and 20% by weight relative to the total weight of the composition according to the invention.

The vinylated polyorganosiloxanes A, the polyorganosiloxane resins H and the polyorganosiloxanes comprising a hydride function B are in amounts such that a molar ratio between the ≡SiH functions and the ≡SiVi functions is between 0.5 and 10 and preferably between 1 and 6.

According to one particular embodiment of the invention, the organopolysiloxane composition comprises:
(A) 100 parts by weight of at least one polyorganosiloxane A exhibiting, per molecule, at least two $C_2$-$C_6$ alkenyl groups bonded to the silicon, and having a viscosity of between 10 and 300 000 mPa·s,
(B) from 0.5 to 50 parts by weight of at least one polyorganosiloxane B exhibiting, per molecule, at least two hydrogen atoms bonded to the silicon and preferably at least three ≡SiH units and having a viscosity of between 1 and 5000 mPa·s,
(C) a catalytically effective amount of at least one catalyst C composed of at least one metal belonging to the platinum group,
(D) from 0.05 to 50 parts by weight of at least one porogenic agent D according to the invention and as described above,
(E) from 0 to 50 parts by weight of at least one diorganopolysiloxane oil E blocked at each end of its chain by a triorganosiloxy unit, the organic radicals of which bonded to the silicon atoms are chosen from alkyl radicals having from 1 to 8 carbon atoms inclusive, such as methyl, ethyl, propyl and 3,3,3-trifluoropropyl groups, cycloalkyl groups, such as cyclohexyl, cycloheptyl and cyclooctyl groups, and aryl groups, such as xylyl, tolyl and phenyl,
(F) from 0.5 to 50 parts of at least one inorganic filler F, (G) from 0 to 10 parts by weight of at least one additive G, and
(H) from 0 to 70 parts by weight of the polyorganosiloxane resin H,
with the additional condition that the choice, the nature and the amount of the constituents are determined such that the viscosity of said composition is less than 55 000 mPa·s and preferably less than 30 000 mPa·s.

According to another of its aspects, the present invention relates to a two-component precursor system P for the organopolysiloxane composition X according to the invention and as defined above and comprising the constituents A, B, C, D, E, F, G and H as defined above, said two-component system S being characterized:
in that it is in two distinct parts P1 and P2 intended to be mixed so as to form said organopolysiloxane composition X and comprising said constituents, and
in that one of the parts P1 or P2 comprises the catalyst C and the porogenic agent D and does not comprise the polyorganosiloxane B.

A subject of the present invention is also a silicone foam capable of being obtained by crosslinking and/or curing of the organopolysiloxane composition X as defined above or by mixing of the parts P1 and P2 of the two-component system S as defined above, followed by crosslinking and/or curing of the resulting composition.

Another subject of the invention relates to the use of the organopolysiloxane composition X, of the two-component system P or of the silicone foam according to the invention and as defined above, for pad printing or the preparation of filling foams or foam seals in the construction, transportation, electrical insulation or domestic electrical appliance field.

The present invention will now be described in greater detail using embodiments taken by way of nonlimiting example.

EXAMPLES

Examples 1 to 10

Preparation of Silicone Foams which Crosslink at Room Temperature

A two-component composition comprising the parts P1 and P2 is prepared from the constituents listed hereinafter (the exact compositions are described in tables 1 and 2):

1) Part P1:
  a: vinylated polyorganosiloxane resin comprising M, $D^{Vi}$ and Q (or "$MD^{Vi}Q$") siloxyl units with Vi=vinyl group, M: $(CH_3)_3SiO_{1/2}$, Q: $SiO_{4/2}$, $D^{Vi}$: $(CH_3)(Vi)SiO_{2/2}$
  b1: polydimethylsiloxane blocked by $(CH_3)_2ViSiO_{1/2}$ units and having a viscosity of 3500 mPa·s at 25° C.
  b2: polydimethylsiloxane blocked by $(CH_3)_2ViSiO_{1/2}$ units and having a viscosity of 10 000 mPa·s at 25° C.
  b3: polydimethylsiloxane blocked by $(CH_3)_2ViSiO_{1/2}$ units and having a viscosity of 60 000 mPa·s at 25° C.
  b4: polydimethylsiloxane oil blocked at each of the chain ends by a $Vi(CH_3)_2SiO_{1/2}$ unit, having a viscosity of 100 000 mPa·s at 25° C.
  c1: fumed silica treated with a silicone oil, having a specific surface area equal to 30 m²/g (BET), sold under the trade name Aerosil® RY50.
  c3: diatomaceous earth sold under the trade name Celite-SF.
  c4: ground crystalline silica having a specific surface area equal to 3.3 m²/g, sold under the trade name Sikron B4000.
  c5: ground crystalline silica surface-treated with a vinylsilane and having a specific surface area equal to 6.5 m²/g, sold under the trade name Silbond 8000TST.
  c6: fumed silica treated with HMDZ (hexamethyldisilazane), having a specific surface area equal to 200 m²/g (BET) and dispersed at 30% in polydimethylsiloxane blocked by $(CH_3)_2ViSiO_{1/2}$ units and having a viscosity of 1500 mPa·s at 25° C.
  d1: butanol or d2: silicone emulsion containing 58.45% by weight of water.
  e: Karstedt platinum catalyst.
  f: polydimethylsiloxane oil blocked at each of the chain ends by a $(CH_3)_3SiO_{1/2}$ unit and having a viscosity of 1000 mPa·s at 25° C.
  g: poly(vinylmethyl)(dimethyl)siloxane oil having a $D^{Vi}$ unit content of 2% by weight and an $M^{Vi}$ unit content of 0.4% by weight (oil with pendant vinylated groups).

2) Part P2:
  a: vinylated polyorganosiloxane resin comprising M, $D^{Vi}$ and Q (or "$MD^{Vi}Q$") siloxyl units.
  b1: polydimethylsiloxane blocked by $(CH_3)_2(Vi)SiO_{1/2}$ units and having a viscosity of 3500 mPa·s.
  b3: polydimethylsiloxane blocked by $(CH_3)_2(Vi)SiO_{1/2}$ units and having a viscosity of 60 000 mPa·s at 25° C.
  b4: polydimethylsiloxane oil blocked at each of the chain ends by a $Vi(CH_3)_2SiO_{1/2}$ unit, having a viscosity of 100 000 mPa·s at 25° C.
  f: polydimethylsiloxane oil blocked at each of the chain ends by a $(CH_3)_3SiO_{1/2}$ unit, having a viscosity of 1000 mPa·s at 25° C.
  i: polydimethylsiloxane oil blocked at each of the chain ends by a $(CH_3)_2HSiO_{1/2}$ unit.
  h: polymethylhydrosiloxane oil blocked at each of the chain ends by a $(CH_3)_3SiO_{1/2}$ unit.
  j: solution containing 1% of ethynylcyclohexanol in a polydimethylsiloxane oil blocked by $(CH_3)_2(Vi)SiO_{1/2}$ units, having a viscosity of 600 mPa·s at 25° C.

Tables 1 and 2 hereinafter describe the compositions tested.

TABLE 1

| | Constituents | Example 1 | Example 2 | Counter Example 4 | Counter Example 5 | Counter Example 6 | Counter Example 7 | Counter Example 8 |
|---|---|---|---|---|---|---|---|---|
| Part P1 | a | 18.75 | 18.75 | 18.75 | 18.75 | 18.75 | 18.75 | 16.75 |
| | b1 | 56.25 | 56.25 | 56.25 | 56.25 | 56.25 | 56.25 | 50.25 |
| | b4 | 6 | 6 | 6 | 6 | 6 | 6 | 0 |
| | c1 | 10 | 4.8 | 0 | 0 | 0 | 0 | 0 |
| | c2 | 0 | 0 | 0 | 0 | 0 | 0 | 0 |
| | c3 | 0 | 0 | 0 | 10 | 0 | 0 | 0 |

TABLE 1-continued

Compositions - parts by weight

| Constituents | | Example 1 | Example 2 | Counter Example 4 | Counter Example 5 | Counter Example 6 | Counter Example 7 | Counter Example 8 |
|---|---|---|---|---|---|---|---|---|
| | c4 | 0 | 0 | 0 | 0 | 10 | 0 | 0 |
| | c5 | 0 | 0 | 0 | 0 | 0 | 10 | 0 |
| | c6 | 0 | 0 | 0 | 0 | 0 | 0 | 30 |
| | d1 | 3 | 3 | 3 | 3 | 3 | 3 | 3 |
| | e | 0.09 | 0.09 | 0.09 | 0.09 | 0.09 | 0.09 | 0.09 |
| | f | 6 | 6 | 6 | 6 | 6 | 6 | 0 |
| Part P2 | a | 10 | 10 | 10 | 10 | 10 | 10 | 12 |
| | b1 | 30 | 30 | 30 | 30 | 30 | 30 | 36 |
| | b4 | 30 | 30 | 30 | 30 | 30 | 30 | 22 |
| | h | 18 | 18 | 18 | 18 | 18 | 18 | 18 |
| | i | 7 | 7 | 7 | 7 | 7 | 7 | 7 |
| | j | 0.1 | 0.1 | 0.1 | 0.1 | 0.1 | 0.1 | 0.1 |
| | f | 4.9 | 4.9 | 4.9 | 4.9 | 4.9 | 4.9 | 4.9 |

TABLE 2

COMPOSITIONS: PARTS BY WEIGHT

| Constituents | | Example 9 | Example 10 |
|---|---|---|---|
| Part P1 | a | 18.75 | 21.24 |
| | b1 | 56.25 | 33.31 |
| | b2 | 0 | 8 |
| | b3 | 0 | 6.86 |
| | b4 | 14.69 | 0 |
| | c1 | 1.5 | 1.5 |
| | d2 | 3.82 | 2 |
| | e | 0.09 | 0.09 |
| | f | 4.90 | 0 |
| | g | 0 | 2 |
| Part P2 | a | 10 | 19.07 |
| | b1 | 30 | 0 |
| | b3 | 0 | 28.60 |
| | b4 | 30 | 26.03 |
| | h | 18 | 18.93 |
| | i | 7 | 7.36 |
| | j | 0 | 0 |
| | f | 4.9 | 0 |

3) Processing:

50 parts by volume of the component P2 are added to 50 parts by volume of the part P1. Foaming and crosslinking are obtained after manual mixing using a spatula, at 23° C. for approximately 30 seconds.

4) Tests

In the present account:

the abbreviation "T/S" means the tensile strength, in MPa according to the AFNOR NF T 46002 standard, the abbreviation hardness S00H means the Shore 00 hardness, the abbreviation "E/B" means the % elongation at break according to the previous standard, and the abbreviation "Tr/S" means the tear strength in N/mm.

the expression "bubbles of small size" is intended to mean bubble sizes of which the width or the diameter is less than or equal to approximately 1 mm, while, for "bubbles of large size", the width or the diameter is greater than 1.5 mm.

TABLE 3

| Properties | | Example 1 | Example 2 | Example 9 | Example 10 |
|---|---|---|---|---|---|
| Viscosity of P1 | | 11 000 | 5120 | 9440 | 15 800 |
| Settling of P1 | | No | No | No | No |
| Density of the crosslinked foam (g/cm³) | | 0.19 | 0.19 | 0.21 | 0.21 |
| S00H after 7 days at 23° C. | | 38 | 37 | 25 | 35 |
| Mechanical properties after 7 days at 23° C. | T/S | 0.21 | 0.19 | 0.10 | 0.20 |
| | E/B | 63 | 63 | 72 | 89 |
| | Tr/S | 0.86 | 0.84 | 0.80 | 1.4 |
| Bubble size | | Small | Small | Small | Small |

TABLE 4

| Properties | | Counter Example 4 | Counter Example 5 | Counter Example 6 | Counter Example 7 | Counter Example 8 |
|---|---|---|---|---|---|---|
| Viscosity of P1 | | 3840 | 5680 | 4520 | 4640 | 4720 |
| Settling of P1 | | No | Yes (<1 week) | Yes (<1 week) | Yes (<1 week) | No |
| Density of the crosslinked foam (g/cm³) | | 0.23 | 0.18 | 0.18 | 0.18 | 0.24 |
| S00H after 7 days at 23° C. | | 26 | 40 | 41 | 40 | 46 |
| Mechanical properties after 7 days at 23° C. | T/S | 0.18 | 0.17 | 0.15 | 0.15 | 0.10 |
| | E/B | 73 | 64 | 53 | 54 | 47 |
| | Tr/S | 1.27 | 0.95 | 0.87 | 0.76 | 0.83 |
| Bubble size | | Large | Small | Small | Small | Large |
| Bubble size dispersion | | heterogeneous | | | | heterogeneous |

As shown by examples 1, 2, 9 and 10 and counter examples 4 to 8, the presence of fumed silica with a low specific surface area according to the invention makes it possible to obtain components (or parts) P1 which do not exhibit any problem of settling of the filler even after several months of storage, and, after mixing with the parts P2 and crosslinking, makes it possible to obtain foams of low densities (less than 0.25 g/cm$^3$) which have good mechanical properties.

Furthermore, all the compositions according to the invention, after mixing of the parts P1 and P2, make it possible to obtain compositions having viscosities of less than 15 000 mPa·s.

Counter example 4 demonstrates the essential presence of fillers according to the invention for obtaining low-density foams with cells of which the sizes are homogeneous and small.

Counter examples 5, 6 and 7 demonstrate that even the presence of crystalline silica with a low specific surface area or of a filler of different nature than silica does not make it possible to simultaneously obtain all the required properties, in particular the nonsettling of the component P1.

Counter example 8 demonstrates that the presence of fumed silica with a high/medium specific surface area (BET specific surface area of 200 m$^2$/g, i.e. very much higher than 65 m$^2$/g) does not make it possible to simultaneously obtain all the required properties, in particular the homogeneity and the size of the bubbles.

The foams obtained according to the invention are homogeneous with pore sizes of less than or equal to 1 mm (or "small bubbles") in contrast to the foams obtained (counter examples 4 to 8) which exhibit either settling problems during storage, or bubble sizes and/or a bubble size dispersion which are too great. The best foams according to the invention are obtained when the specific surface area of the fumed silica is between 25 and 45 g/m.

The invention claimed is:

1. An organopolysiloxane composition X which is a precursor of a silicone foam, comprising:
    at least one polyorganosiloxane A having a viscosity of from 10 to 300 000 mPa.s and exhibiting, per molecule, at least two $C_2$-$C_6$ alkenyl groups bonded to the silicon,
    at least one polyorganosiloxane B having a viscosity of from 1 to 5000 mPa.s and exhibiting, per molecule, at least two ≡SiH units,
    a catalytically effective amount of at least one catalyst C which is a compound derived from at least one metal belonging to the platinum group,
    at least one porogenic agent D,
    optionally at least one diorganopolysiloxane oil E blocked at each end of a diorganopolysiloxane chain thereof, by a triorganosiloxy unit, the organic radicals of which bonded to the silicon atoms are selected from alkyl radicals having from 1 to 8 carbon atoms inclusive, cycloalkyl groups, and aryl groups,
    at least one inorganic filler F which is a fumed silica, with a specific surface area S of less than 65 m$^2$/g,
    optionally at least one additive G, and
    optionally at least one polyorganosiloxane resin H,
    with the additional condition that the choice, the nature and the amount of the constituents are determined such that the viscosity of said organopolysiloxane composition X is less than 55 000 mPa.s and said viscosities are dynamic viscosities measured at 25° C. using a Brookfield viscometer according to the instructions of the AFNOR NFT 76-102 standard,
    wherein the amount of the inorganic filler F is from 0.1 to 20 parts by weight per 100 parts by weight of the organopolysiloxane composition X.

2. The organopolysiloxane composition X as claimed in claim 1, wherein the inorganic filler F is a fumed silica, the specific surface area S of which is included in the following range 25 m$^2$/g≤S≤45 m$^2$/g.

3. The organopolysiloxane composition X as claimed in claim 1, wherein the inorganic filler F is a fumed silica, the surface of which has been pretreated.

4. The organopolysiloxane composition X as claimed in claim 1, wherein the porogenic agent D is a compound comprising a hydroxyl function and which is not a retarder or an inhibitor of a hydrosilylation reaction.

5. The organopolysiloxane composition X as claimed in claim 1, wherein the porogenic agent D is a compound selected from the group consisting of a polyol, an alcohol which is not a retarder or an inhibitor of the hydrosilylation reaction an organosilane or a polyorganosilane containing at least one silanol function, and water.

6. The organopolysiloxane composition X as claimed in claim 1, wherein the porogenic agent D is a compound selected from the group consisting of a diol which is not a retarder or an inhibitor of the hydrosilylation reaction, an organic alcohol having from 1 to 12 carbon atoms and having one hydroxyl function per molecule, an organosilane or a polyorganosilane comprising at least one silanol function, and water.

7. A two-component precursor system P for the organopolysiloxane composition X of claim 1 said two-component system P comprising
    two distinct parts P1 and P2 intended to be mixed so as to form said organopolysiloxane composition X; and wherein
    one of the parts P1 or P2 comprises the catalyst C and the porogenic agent D and does not comprise the polyorganosiloxane B.

8. A silicone foam obtained by crosslinking and/or curing of the organopolysiloxane composition X as defined in claim 1.

9. A organopolysiloxane composition X as defined in claim 1, adapted for being used for for pad printing.

10. A organopolysiloxane composition X as defined in claim 1, adapted for being used for the for the preparation of filling foams or foam seals in construction, transportation, electrical insulation and/or domestic electrical appliance field.

11. A silicone foam capable of being obtained by mixing of the parts P1 and P2 of the two-component system P as defined in claim 7, followed by crosslinking and/or curing of the resulting composition.

12. The organopolysiloxane composition X as claimed in claim 1, wherein at least one diorganopolysiloxane oil E blocked at each end of said diorganopolysiloxane chain by a triorganosiloxy unit is present, and the organic radicals of bonded to the silicon atoms are selected from methyl, ethyl, propyl, 3,3,3-trifluoropropyl, cyclohexyl, cycloheptyl, cyclooctyl groups, xylyl, tolyl and phenyl groups.

13. The organopolysiloxane composition X as claimed in claim 1, wherein the at least one inorganic filler F which is a fumed silica, has a specific surface area S of less than 50 m$^2$/g, and with the additional condition that the choice, the nature and the amount of the constituents are determined such that the viscosity of said organopolysiloxane composition X is less than 30 000 mPa.s and said viscosities are dynamic viscosities measured at 25° C. using a Brookfield viscometer according to the instructions of the AFNOR NFT 76-102 standard.

14. The foam as claimed in claim 11, which has a density of less than 0.35 g/cm3 and a bubble size of less than or equal to 1 mm.

15. The organopolysiloxane composition X as claimed in claim 1, wherein the at least one polyorganosiloxane B having a viscosity of from 1 to 5000 mPa.s and exhibiting, per molecule, at least three ≡SiH units.

16. The organopolysiloxane composition X as claimed in claim 1, comprising polyorganosiloxane resin H.

17. The organopolysiloxane composition X as claimed in claim 1, comprising 100 parts by weight of (A), 0.5 to 50 parts by weight of (B), and 0.05 to 50 parts by weight of D, 0 to 50 parts by weight of (E), 0 to 10 parts by weight of (G), and 0 to 70 parts by weight of (H).

* * * * *